(12) United States Patent
Michel

(10) Patent No.: US 8,205,864 B2
(45) Date of Patent: Jun. 26, 2012

(54) STRUT FOR A WHEEL SUSPENSION OF MOTOR VEHICLES

(75) Inventor: Wilfried Michel, Riedenburg (DE)

(73) Assignee: Audi, AG, Ingolstadt (DE)

( * ) Notice: Subject to any disclaimer, the term of this patent is extended or adjusted under 35 U.S.C. 154(b) by 968 days.

(21) Appl. No.: 12/196,206

(22) Filed: Aug. 21, 2008

(65) Prior Publication Data
US 2009/0057969 A1    Mar. 5, 2009

(30) Foreign Application Priority Data

Aug. 29, 2007  (DE) .......................... 10 2007 040 734

(51) Int. Cl.
*B60G 17/015* (2006.01)
*B60G 15/06* (2006.01)

(52) U.S. Cl. ...................... 267/218; 267/177; 280/5.514; 188/299.1

(58) Field of Classification Search .............. 280/5.514, 280/5.515, 124.154, 124.155; 188/299.1; 267/218, 255, 177, 175
See application file for complete search history.

(56) References Cited

U.S. PATENT DOCUMENTS

| | | | | |
|---|---|---|---|---|
| 4,248,410 A * | 2/1981 | Sano et al. | ..................... | 267/290 |
| 5,803,443 A * | 9/1998 | Chang | ........................... | 267/221 |
| 6,676,119 B2 * | 1/2004 | Becker et al. | .................. | 267/218 |
| 6,857,625 B2 * | 2/2005 | Loser et al. | ..................... | 267/175 |
| 7,469,910 B2 * | 12/2008 | Munster et al. | ............. | 280/5.514 |
| 7,644,935 B2 * | 1/2010 | Munster et al. | ............. | 280/5.514 |
| 7,784,800 B2 * | 8/2010 | Michel | ......................... | 280/5.514 |
| 7,857,335 B2 * | 12/2010 | Wilfried | ................. | 280/124.155 |
| 7,922,181 B2 * | 4/2011 | Hakui et al. | ................ | 280/6.157 |
| 2004/0036206 A1 * | 2/2004 | Loser et al. | ..................... | 267/218 |
| 2006/0163787 A1 * | 7/2006 | Munster et al. | ................ | 267/221 |
| 2006/0163863 A1 * | 7/2006 | Ellmann et al. | ................ | 280/788 |
| 2010/0308518 A1 * | 12/2010 | Michel | .......................... | 267/218 |

FOREIGN PATENT DOCUMENTS

| | | |
|---|---|---|
| DE | 10 2005 001 737 A1 | 7/2006 |
| DE | 10 2005 001 739 A1 | 7/2006 |
| DE | 10 2005 053 493 A1 | 10/2006 |
| EP | 1 681 186 A1 | 7/2006 |
| FR | 2 840 257 A1 | 12/2003 |

* cited by examiner

*Primary Examiner* — Bradley King
*Assistant Examiner* — Thomas Irvin
(74) *Attorney, Agent, or Firm* — Novak Druce + Quigg LLP

(57) ABSTRACT

The invention relates to a strut for a wheel suspension of motor vehicles, comprising a telescoping shock absorber and a support spring which surrounds it, as well as with a vertical adjustment means with a driven driving spindle which is pivoted by way of a body-mounted bearing on the engine housing side, which interacts with a vertically adjustable lifting element which is arranged to be non-rotatable and which bears the spring plate of the support spring. According to the invention, the driving spindle, in addition to the body-mounted bearing, is supported directly or indirectly on the cylinder tube of the shock absorber to be able to pivot and move axially relative to it.

10 Claims, 4 Drawing Sheets

STRUT FOR A WHEEL SUSPENSION OF MOTOR VEHICLES

CROSS-REFERENCE TO RELATED APPLICATIONS

This application claims priority from German Patent Application No. 10 10 2007 040 734.5 filed Aug. 29, 2007.

The invention relates to a strut for a wheel suspension of motor vehicles.

BACKGROUND OF THE INVENTION

A generic active strut with a vertical adjustment means is shown by DE 10 2005 053 493 A1. It discloses that the threaded spindle of a ball screw drive, which spindle is driven by way of an electric motor actuator, is pivoted to be axially immovable by way of two anti-friction bearings on a body-mounted guide sleeve and axially adjusts a ball screw nut which in turn vertically adjusts the adjustable spring plate of the support spring of the wheel suspension.

Between the vehicle body and the active strut there is a damper bearing which here is an elastomer bearing in a rubber-metal execution. The damper bearing eliminates high frequency vibrations which would otherwise travel from the roadway via the running gear into the body. Moreover, roadway impacts are reduced, such as, for example, when driving over obstacles and sections of bad road, potholes, etc. The damper bearing is therefore designed according to special characteristics, for example, a progressive spring characteristic, as a result of which the damper bearing hardens as the spring path increases.

The damper bearing accommodates the universal motion which is impressed on the strut by the kinematics of the wheel guiding elements. The force/moment is transmitted to the strut here via the joining site between a support rod and the strut. Thus, the entire damper is deflected in operation, the load moment and opposing force on the clamping of the piston rod being accommodated. Since the forced damper bearing already offers considerable resistance to deformation, the piston rod necessarily bends. In this way the section of the threaded spring which projects freely over the cylinder tube of the shock absorber can disadvantageously come into contact with the oscillating damper as a result of the kinematics-induced impressed forces in the shock absorber.

SUMMARY OF THE INVENTION

The object of the invention is to develop a strut of the generic type such that smooth and reliable vertical adjustment is ensured.

It is suggested according to the invention that the driving spindle of the vertical adjustment means in addition to an upper, engine housing-side bearing arrangement is supported directly or indirectly on the cylinder tube of the shock absorber to be able to pivot and move axially relative to it. In order to avoid overdetermination of the bearing, the guide sleeve which is provided in the prior art, together with the lower bearing arrangement, is omitted without replacement. In this way the damper can now dip completely into the threaded spindle, almost as far as the upper bearing arrangement. The result is a tremendous gain in damper length and stroke.

With the lower bearing unit of the hollow cylindrical driving spindle according to the invention, on the cylinder tube of the shock absorber the oscillating damper is technically perfectly supported relative to the rotating driving spindle. For a relatively large bearing distance between this additional second bearing site and the damper bearing a self-stabilizing effect with respect to the spindle/damper system arises. The large bearing distance is preserved over the lifting motion of the damper. Piston rod deflection is minimized, as a result of which very low stresses in the piston rod and thus minimum transverse force in the rod guide arise. This leads in turn to a reduction of friction, as a result of which the response sensitivity of damping is improved. Moreover, in the bearing unit according to the invention, a tension stop for the lifting element, i.e., the threaded nut, can also be integrated at the same time.

It is structurally especially favorable to attach a separate, sleeve-shaped bearing part to the driving and threaded spindle, which part has a pivot bearing arrangement and a linear bearing arrangement. This ensures that both in the radial and also in the axial direction there is smooth and durable guidance which can reliably support potential transverse forces and torques.

The pivot bearing and the linear bearing can interact with the bearing part by way of the inner bearing sleeve on the one hand and directly or indirectly with the cylinder tube of the shock absorber on the other in a manner favorable to production engineering. This results in a preassembly unit which can be easily and quickly installed. The pivot bearing can preferably be formed by two separate anti-friction bearings, of which one is a needle bearing and the other is a double-acting axial bearing. This enables guidance of the threaded spindle which is precise for separate bearing units both in the axial and also in the radial direction.

In a manner which is favorable to construction and production engineering, the inner bearing sleeve can have a radial flange with stop surfaces for two roller elements which are located in the bearing part on both sides of the radial flange.

In an advantageous development of the invention, the linear bearing can be formed by several peripherally distributed ball tracks in the inner bearing sleeve and in the cylinder tube or in a guide cylinder which has been placed onto the cylinder tube, between which there are corresponding rows of balls.

Simple mounting of the guide tube is thus achieved by the guide tube which has been placed onto the cylinder tube of the shock absorber on the one hand being supported on the cylinder tube by way of an molded-on ring collar and on the other by its being permanently connected to the cylinder tube by rolling or caulking.

Furthermore, in an especially simple manner, the bearing part can be permanently connected to the threaded spindle by way of a central threaded connection. This enables simplified production of the individual parts, that is, the threaded spindle and bearing part, with the inner bearing sleeve, for an uncomplicated assembly at a later date.

Alternatively, the pivot bearing can be formed by at least one axially and radially supporting ball bearing which, accordingly located between the bearing part and the inner bearing sleeve, undertakes both axial and also radial guidance of the threaded spindle.

In another alternative configuration, finally the pivot bearing can be formed by a needle bearing and stop washers which interact with it between the bearing part and the inner bearing sleeve.

DETAILED DESCRIPTION OF THE PREFERRED EMBODIMENT OF THE INVENTION

Figure 1:
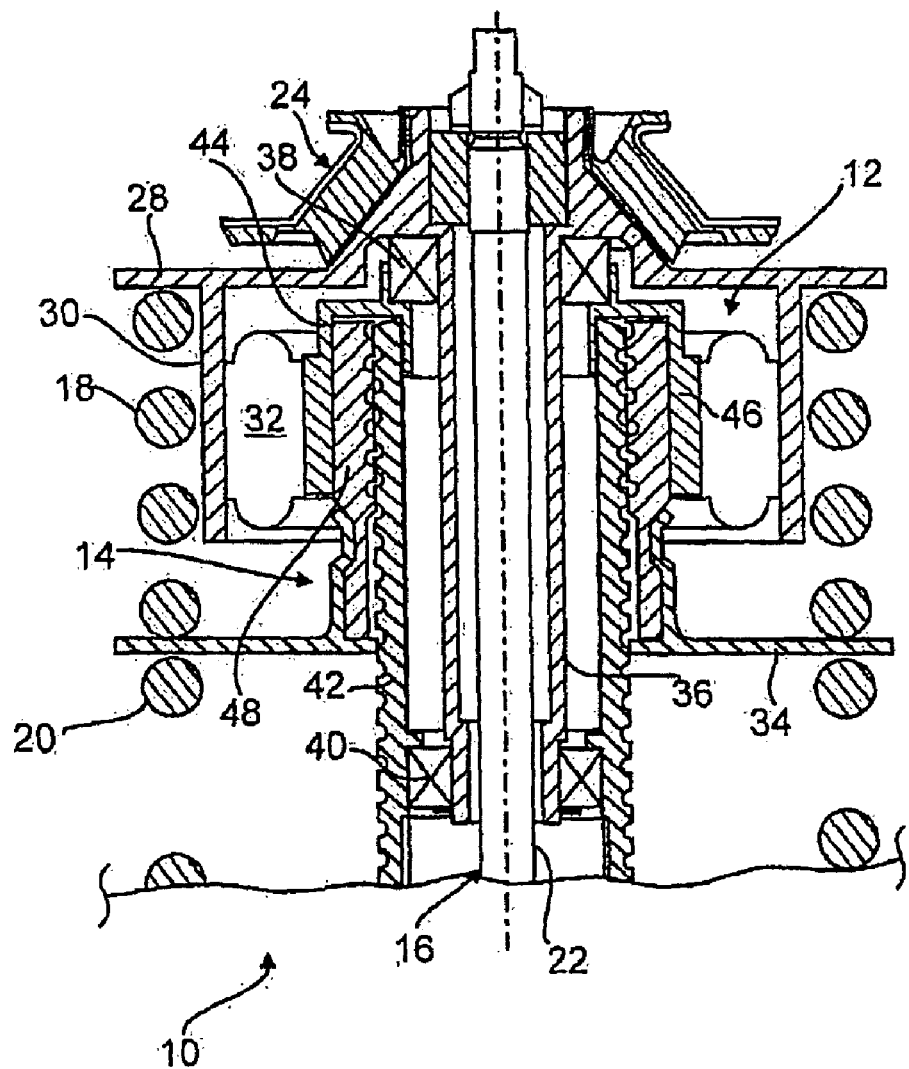
FIG. 1 shows as a comparison example the upper section of the strut of a wheel suspension known from the prior art for motor vehicles in a longitudinal section, with a vertical adjustment device with an electric motor actuator and a ball screw drive.

FIG. 1 shows as a comparison example in an upper section the strut 10 of a wheel suspension which is not further shown, which strut is known from the prior art, for motor vehicles, with a vertical adjustment device which is composed essentially of an electric motor actuator 12 and a ball screw drive 14.

The strut 10 has a conventional telescoping shock absorber 16 and a helical compression spring which surrounds it and which is only partially shown as the support spring 20. Furthermore there is a compensating spring 18.

The shock absorber 16 with its piston rod 22 is coupled by way of a rubber-elastic damper bearing 24 (FIG. 1) to the body of the vehicle which is not shown, while its cylinder tube 26 (FIG. 2) is coupled or attached to a connecting rod which is not shown or to a wheel carrier of the wheel suspension.

The compensating spring 18 is solidly supported on the body-side by way of a spring plate 28. The spring plate 28 is part of a cup-shaped housing 30 which also holds the annular stator 32 of the actuator 12.

Furthermore, the compensating spring 18 is supported on an axially adjustable spring plate 34 on which the support spring 20 also acts, as is shown. The support spring 20 is moreover solidly supported on the cylinder tube 26 of the shock absorber 16 in the known manner which is not shown.

On the housing 30 around the piston rod 22 there is furthermore a guide sleeve 36 which projects axially down, on which the hollow-cylindrical threaded spindle 42 of the ball screw drive 14 is pivoted by way of an upper and a lower anti-friction bearing 38, 40. The threaded spindle 42 is drive-connected via a flange part 44 to the rotor 46 of the actuator 12.

The threaded spindle 42 interacts by way of balls 43 (FIG. 2) with the ball screw nut 48 which is located around the threaded spindle 42 and which bears the adjustable spring plate 34, as is shown.

By turning the threaded spindle 42 using an electric motor thus the ball screw nut 48 is axially displaced, by which the body of the motor vehicle can be raised or lowered via the support spring 20. The compensating spring 18 is used conventionally to reduce the actuating forces which are to be applied via the actuator 12.

Figure 2:
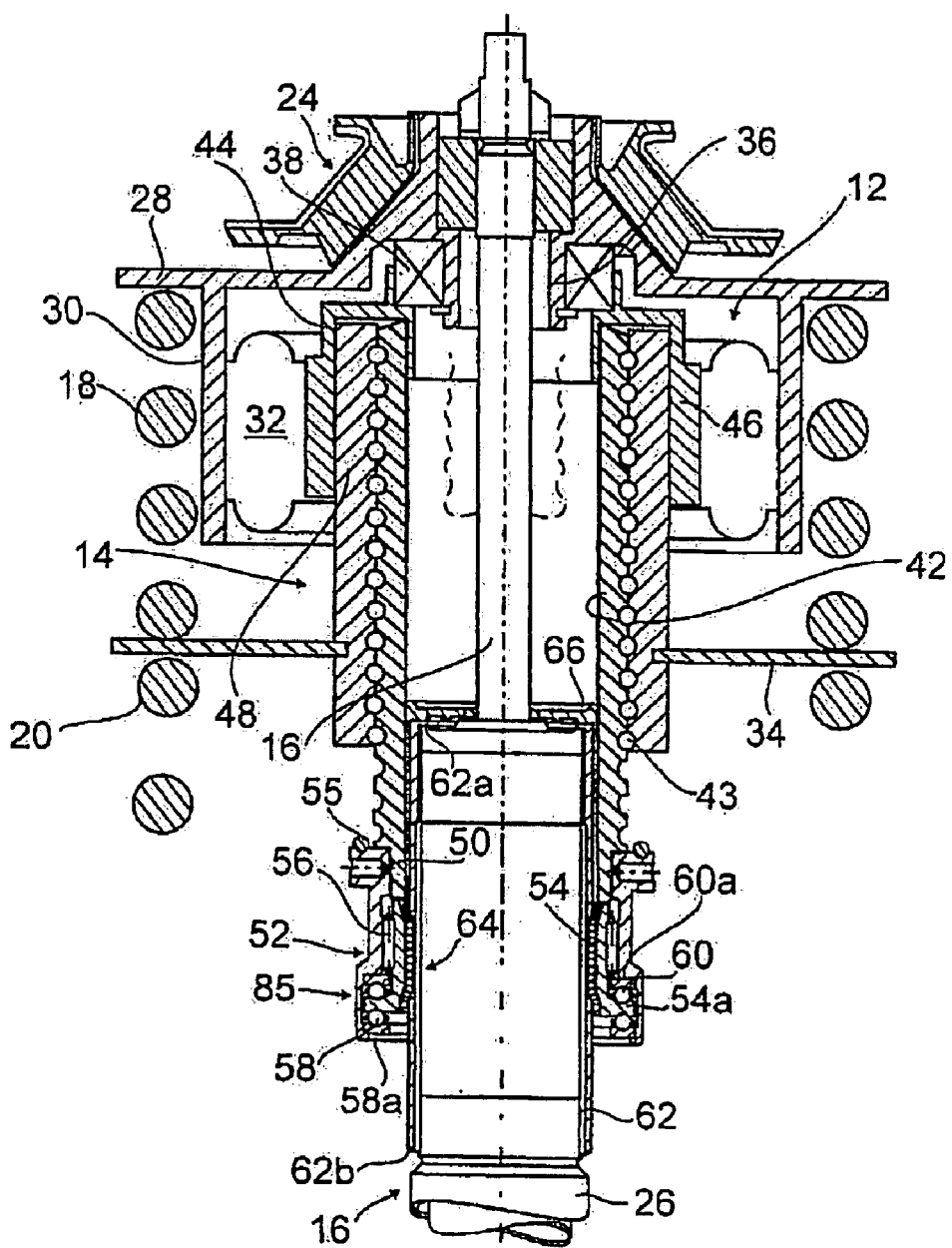
FIG. 2 shows an overall section of the strut in a view according to FIG. 1, with a pivot bearing arrangement and linear bearing arrangement between the threaded spindle of the ball screw drive and the cylinder tube of the shock absorber.
Figure 3:
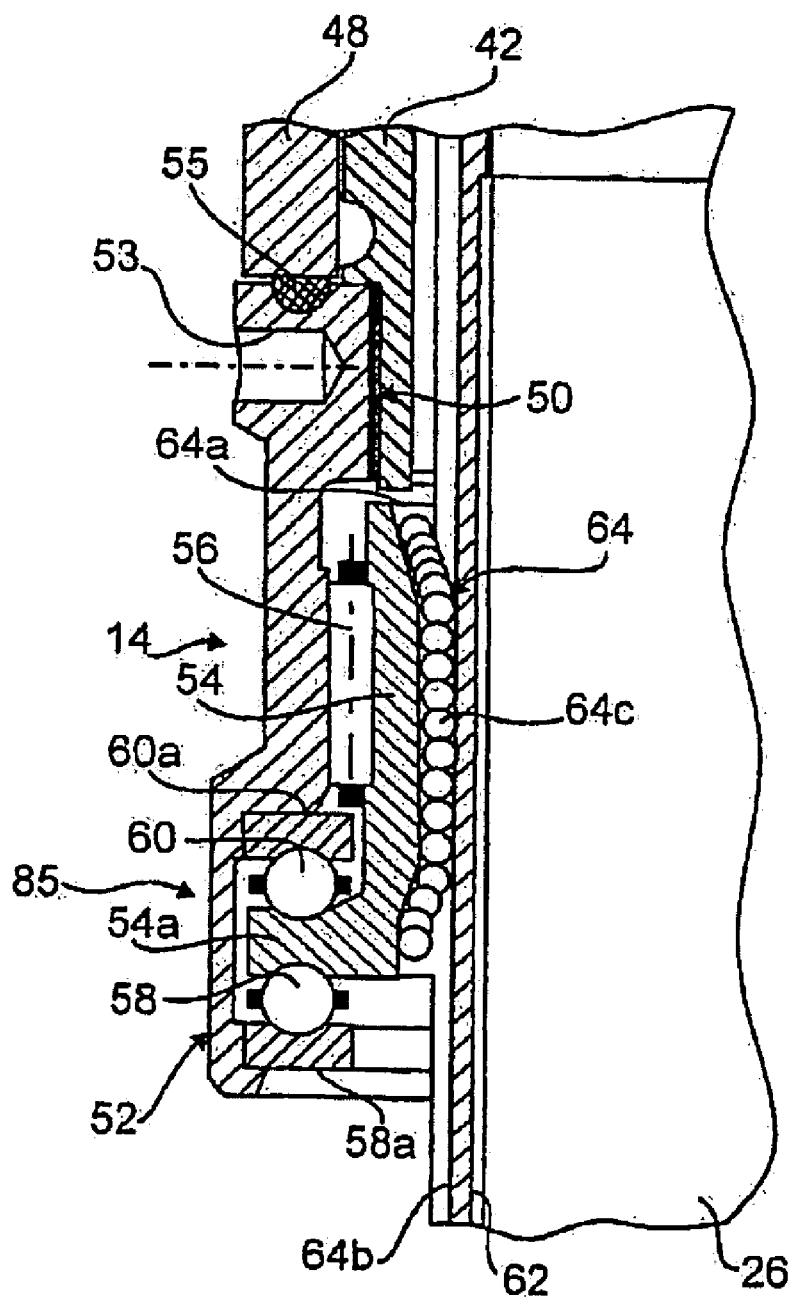
FIG. 3 shows the pivot bearing arrangement and the linear bearing arrangement according to FIG. 2 in an enlargement.

As mentioned above, in the comparison example of FIG. 1, the pivot bearing arrangement of the threaded spindle 42 on the guide sleeve 36 takes place via the upper and the lower anti-friction bearings 38, 40. Conversely, in the strut according to the invention as shown in FIGS. 2 and 3, the lower anti-friction bearing 40 is replaced by a pivot and linear bearing arrangement which is still to be described between the threaded spindle 42 which projects over the cylinder tube 26 of the shock absorber 16, and the cylinder tube 26. The strut components of FIGS. 2 and 3 which are identical to the strut components of FIG. 1 in structure and manner of operation are provided with the same reference numbers.

In order to avoid overdetermination of the bearing, as shown in FIG. 2 the lower anti-friction bearing 40 is omitted without replacement. Accordingly, the guide sleeve 36 which projects down in FIG. 1 is also omitted. It is replaced in FIG. 2 by a body-mounted sleeve attachment piece 36 which carries the upper anti-friction bearing 38. In this way the damper can now dip into the threaded spindle 42 almost as far as the upper anti-friction bearing 38.

For this purpose, a tubular bearing part 52 which projects down is securely screwed onto the corresponding outside thread of the threaded spindle 42 by way of a central threaded connection at 50. One or more transverse holes 53 in the bearing part 52 are used for the placement of a screwing tool (not shown). Furthermore, on the upper end surface of the bearing part 52, a damping ring 55 is inserted which is used as an elastic stop for the ball screw nut 48.

The bearing part 52 has an inner bearing sleeve 54 which as a radial bearing is pivoted by way of a needle bearing 56 in the bearing part 52. Furthermore, a radial flange 54a, into which annular roller tracks (without reference numbers) for the roller elements 58, 60 which are located on both sides of the radial flange 54a are machined, is molded onto the inner bearing sleeve 54. The roller elements 58, 60 are used as a double-acting axial bearing 85. The stop rings 58a, 60a of the axial bearing 85 are attached to the bearing part 52, as is shown.

Furthermore, the inner bearing sleeve 54 with a guide sleeve 62 on the cylinder tube 26 of the shock absorber 16 forms a linear bearing 64. For this purpose several peripherally offset, axially running ball tracks 64a (cf. FIG. 3) which interact with likewise axially aligned ball tracks 64b in the guide sleeve 62 with interposition of rows 64c of balls are machined into the inner bearing sleeve 54. The inner bearing sleeve 54 is thus non-rotatably guided on the guide sleeve 62 in the peripheral direction. This rotary locking prevents the ball liner from turning radially on the damper tube as a result of the forces of inertia and residual friction.

As is to be seen in FIG. 2, the linear guide via the linear bearing 64, the radial bearing 56, and the double acting axial bearing 85 are combined in a common unit. The bearings in the unit can be provided with lifetime lubrication. Covering which is not shown in the figures, in exactly the same manner as for the ball screw drive, takes place via an outside bellows.

In order to enable corresponding air displacement and/or air intake in the strut according to the invention when the damper oscillates, on the upper damper attachment there are correspondingly dimensioned holes. These holes, moreover, effect optimum cooling of the damper.

As is to be seen in particular in FIG. 2, the relative motion between the threaded spindle 42 and the damper is broken down into a linear and into a rotary component, the inner bearing sleeve 54 as an "intermediate element" effecting the separation between the two directions of motion.

The guide sleeve 62 (cf. FIG. 2) on its upper end is supported on the cylinder tube 26 by means of a ring collar 62a which is molded on and which runs radially to the inside, and on its lower end at 62b it is fixed in a groove 26a of the cylinder tube 26 by bending it round. It is furthermore positively held by at least one axial groove in the peripheral direction, the respective projections or bridges (not shown)

being provided on the cylinder tube 26. Moreover, a stop cup 66 for a rubber-elastic stop buffer which is not shown is placed onto the guide tube 62.

By way of the bearing part 52 which is permanently connected to the threaded spindle 42 with the inner bearing sleeve 54, in separate bearings 56, 58, 60, 64, a pivot bearing arrangement, axial bearing arrangement and/or support, and a linear bearing arrangement is formed between the threaded spindle 42 and the guide sleeve 62 and/or the cylinder tube 26 of the shock absorber 16 which ensures smooth, nonsticking actuation of the vertical adjustment 12, 14 and its components.

Figure 4:
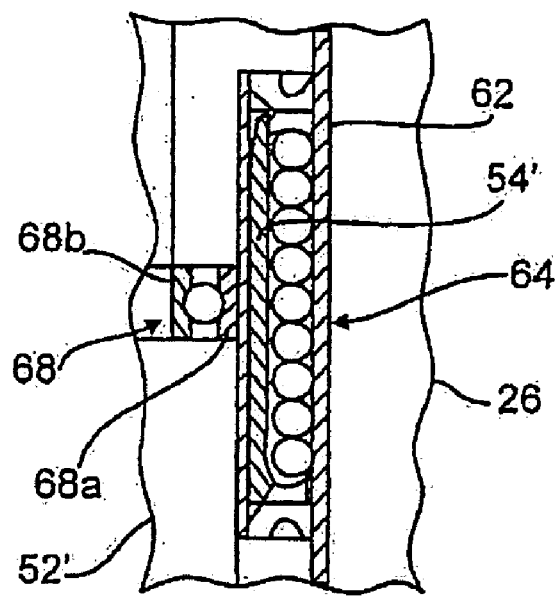
FIG. 4 shows a partial view of a pivot bearing arrangement and the linear bearing arrangement which are alternative to FIG. 3 with an axially and radially guiding ball bearing.

FIG. 4 shows an alternative pivot bearing arrangement which is shown only in sections between the threaded spindle 42 and/or the bearing part 52' which is attached to it and the guide sleeve 62 on the cylinder tube 26 of the shock absorber 16.

Instead of the needle bearing 56 and the axial bearing 58, 60, a ball bearing 68, which provides both axial and radial support, is used, whose inner bearing ring 68*a* is fixed on the inner bearing sleeve 54' and its outer bearing ring 68*b* on the bearing part 52'. The linear bearing 64 is made essentially as above.

Figure 5:
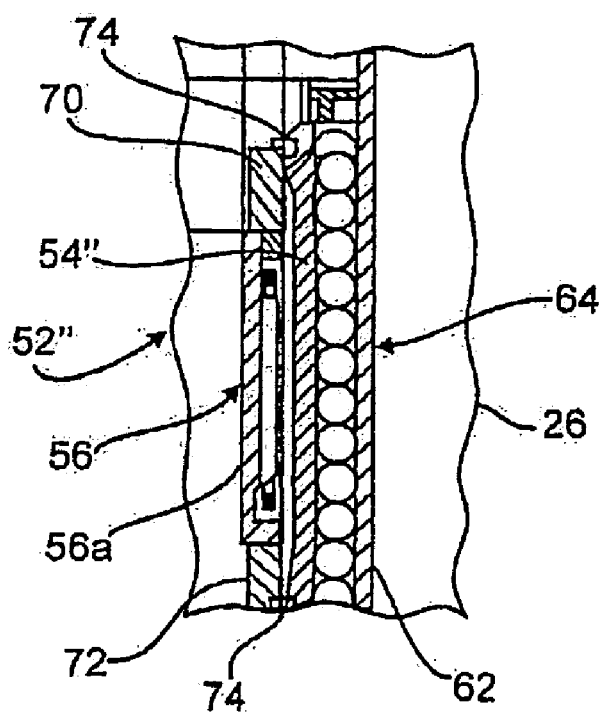
FIG. 5 shows another partial view of a pivot bearing arrangement and linear bearing arrangement which are alternative to FIG. 3 with a needle bearing and stop washers which interact with it.

FIG. 5 finally shows another alternative embodiment of the pivot bearing arrangement between the threaded spindle 42 and/or the bearing part 52" attached to it and the guide sleeve 62 on the cylinder tube 26 of the shock absorber 16.

Here, instead of the axial bearing arrangements 58, 60 as shown in FIGS. 2 and 3, the needle bearing 56 interacts with the stop washers 70, 72 for axial locking. The stop washers 70, 72, connected to the outer bearing ring 56*a* of the needle bearing 56, are then inserted into the bearing part 52", while the inner bearing sleeve 54" is held axially via snap rings 74. The linear bearing 64 is in turn made essentially as described above.

The described pivot and linear bearing arrangements can be made permanently lubricated. Furthermore, in particular a rubber-elastic protective sleeve (not shown) can be located between the movable spring plate 34 and the cylinder tube 26 of the shock absorber 16; it covers the indicated bearing arrangements and guides.

The invention is not limited to the described embodiments. Thus, for example the anti-friction bearing 40 (FIG. 1), can be omitted based on the additional pivot and linear bearing arrangements as shown in FIGS. 2 to 5.

The invention claimed is:

1. A strut for a wheel suspension of a motor vehicles comprising:
   a shock absorber including a cylinder connectable to a wheel suspension component and a rod connectable to a body component of said vehicle;
   a first sleeve member supported on said cylinder provided with a first bearing disposed coaxiatly relative to said shock absorber between said first sleeve member and said body component and a second bearing disposed coaxially relative to said shock absorber between, said first sleeve member and said cylinder, allowing rotation of said first sleeve member about the axis of said shock absorber, and a third bearing disposed between said first sleeve and said cylinder allowing said cylinder to displace axially relative to said first sleeve member;
   a second sleeve member disposed coaxially relative to said first sleeve member, mounted on mad having a ball and groove connection with said first sleeve member, causing said second sleeve member to display axially upon rotation of said first sleeve member;
   means supported on said body component for selectively rotating said first sleeve member, causing it to react through said ball and groove connection and correspondingly axially displace said second sleeve member;
   a support spring interposed between a component of said wheel suspension and said second sleeve member; and
   a compensating spring interposed between said second sleeve member and said component of said vehicle body.

2. A strut according to claim 1, wherein said means for selectively rotating said first sleeve member comprises an electric motor having a stator mounted on a body component of said vehicle and a stator connected to said first sleeve member.

3. A strut according to claim 1 including a third sleeve member interposed between said first sleeve member and said cylinder, wherein said second bearing is interposed between said first and third sleeve member and said third bearing is interposed between said third sleeve member and said cylinder.

4. A strut according to claim 3 wherein said third sleeve member includes an annular, radially projecting portion relative to the axis of said shock absorber, and said second bearing is disposed between said annular, radially projecting portion and said first sleeve member.

5. A strut according to claim 4 wherein said third sleeve member includes a cylindrical portion, and a bearing is provided between said cylindrical portion and said first sleeve member.

6. A strut according to claim 4 wherein said third sleeve member includes a cylindrical portion and a said third bearing is disposed between said cylindrical portion and said cylinder.

7. A strut according to claim 3 wherein said third bearing comprises a set of balls disposed in aligned, recessed tracks in said third sleeve member and a portion of said cylinder.

8. A strut according to claim 3, wherein said first sleeve member includes a first portion mounted on said first bearing and a second portions detachably secured to said first portion thereof and mounted on said second bearing.

9. A strut according to claim 8 wherein said first and second portions of said first sleeve member are detachably secured together by a threaded connection.

10. A strut according to claim 3 wherein said second sleeve member includes an annular, radially disposed plate engaged by said springs.

* * * * *

UNITED STATES PATENT AND TRADEMARK OFFICE
CERTIFICATE OF CORRECTION

PATENT NO. : 8,205,864 B2  
APPLICATION NO. : 12/196206  
DATED : June 26, 2012  
INVENTOR(S) : Michel Page 1 of 1

It is certified that error appears in the above-identified patent and that said Letters Patent is hereby corrected as shown below:

Claim 1: Column 6, line 7 should read: "...mounted on ~~mad~~ <u>and</u> having a ball..."

Signed and Sealed this
Eighteenth Day of September, 2012

David J. Kappos
*Director of the United States Patent and Trademark Office*